(12) United States Patent
Boyle

(10) Patent No.: US 9,280,526 B1
(45) Date of Patent: Mar. 8, 2016

(54) MOBILE APPLICATION UTILIZING ACCELEROMETER-BASED CONTROL

(71) Applicant: Joingo, LLC, San Jose, CA (US)

(72) Inventor: Stephen S. Boyle, Lincoln, CA (US)

(73) Assignee: Joingo, LLC, San Jose, CA (US)

( * ) Notice: Subject to any disclaimer, the term of this patent is extended or adjusted under 35 U.S.C. 154(b) by 361 days.

(21) Appl. No.: 13/791,876

(22) Filed: Mar. 8, 2013

Related U.S. Application Data

(60) Provisional application No. 61/624,245, filed on Apr. 13, 2012.

(51) Int. Cl.
*G06F 17/22* (2006.01)
*G06F 17/30* (2006.01)
*G06F 1/16* (2006.01)
*H04W 4/02* (2009.01)

(52) U.S. Cl.
CPC .......... *G06F 17/2247* (2013.01); *G06F 1/1694* (2013.01); *G06F 17/2235* (2013.01); *G06F 17/30887* (2013.01); *H04W 4/02* (2013.01)

(58) Field of Classification Search
CPC ............ G06F 17/2247; G06F 17/2235; G06F 17/30887; G06F 1/1694; G06Q 10/109; G06Q 10/1093; G06Q 10/02; H04W 4/206; H04W 4/02
See application file for complete search history.

(56) References Cited

U.S. PATENT DOCUMENTS

| 7,254,388 | B2 | 8/2007 | Nam et al. | |
|---|---|---|---|---|
| 8,170,621 | B1 * | 5/2012 | Lockwood | H04W 52/0254 455/550.1 |
| 8,233,925 | B1 | 7/2012 | Boyle et al. | |
| 8,291,341 | B2 * | 10/2012 | Tseng | G06F 1/1624 345/173 |
| 8,433,342 | B1 | 4/2013 | Boyle et al. | |
| 8,438,373 | B2 * | 5/2013 | Rubin et al. | 713/1 |
| 8,464,036 | B2 * | 6/2013 | Rubin et al. | 713/1 |
| 8,712,820 | B2 * | 4/2014 | Gingras et al. | 705/7.18 |
| 8,868,550 | B2 * | 10/2014 | Doppelt et al. | 707/724 |
| 2004/0171380 | A1 | 9/2004 | Puranik et al. | |
| 2006/0073788 | A1 | 4/2006 | Halkka et al. | |
| 2007/0073808 | A1 | 3/2007 | Berrey et al. | |
| 2007/0088801 | A1 | 4/2007 | Levkovitz et al. | |
| 2008/0059631 | A1 | 3/2008 | Bergstrom et al. | |
| 2008/0287095 | A1 | 11/2008 | Pousti | |
| 2009/0024457 | A1 | 1/2009 | Foroutan | |
| 2009/0088219 | A1 | 4/2009 | Bayne | |
| 2009/0138337 | A1 | 5/2009 | Moukas et al. | |
| 2009/0164310 | A1 | 6/2009 | Grossman | |
| 2009/0203359 | A1 | 8/2009 | Makhoul et al. | |
| 2009/0204496 | A1 | 8/2009 | Otto et al. | |
| 2009/0303204 | A1 * | 12/2009 | Nasiri | A63F 13/06 345/184 |
| 2009/0325607 | A1 * | 12/2009 | Conway | G06F 1/1624 455/456.3 |
| 2009/0327488 | A1 | 12/2009 | Sampat et al. | |
| 2010/0004045 | A1 | 1/2010 | Roemer | |
| 2010/0121709 | A1 | 5/2010 | Berezin et al. | |
| 2010/0273139 | A1 * | 10/2010 | Doppelt et al. | 434/327 |
| 2011/0039602 | A1 * | 2/2011 | McNamara et al. | 455/566 |
| 2011/0054977 | A1 | 3/2011 | Jaffer | |
| 2011/0071878 | A1 * | 3/2011 | Gingras et al. | 705/8 |
| 2011/0191152 | A1 | 8/2011 | Schwartz | |
| 2011/0223937 | A1 | 9/2011 | Leppanen et al. | |

(Continued)

*Primary Examiner* — Maikhanh Nguyen
(74) *Attorney, Agent, or Firm* — Clause Eight IPS; Michael Catania

(57) ABSTRACT

A resident mobile application for application and mobile web navigation on a mobile communication device is disclosed herein. The resident mobile application interfaces with a motion sensor of a mobile communication device.

10 Claims, 5 Drawing Sheets

(56) References Cited

U.S. PATENT DOCUMENTS

2012/0035881 A1* 2/2012 Rubin et al. .......... 702/141
2012/0047011 A1 2/2012 Rippetoe et al.
2012/0096249 A1* 4/2012 Rubin et al. .......... 713/1
2012/0203620 A1 8/2012 Dobyns

* cited by examiner

MOBILE APPLICATION UTILIZING ACCELEROMETER-BASED CONTROL

CROSS REFERENCES TO RELATED APPLICATIONS

The present application claims priority to U.S. Provisional Patent Application No. 61/624,245, filed on Apr. 13, 2012, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to mobile applications. More specifically, the present invention relates to a mobile application that utilizes an accelerometer based control.

2. Description of the Related Art

Many mobile communication devices that utilize touch screen technology only have one control button to activate a command. This creates difficulties sending a command if a person is holding an item in one hand and the mobile communication device in the other hand. Further, a more physical action is warranted at times to send a command on a mobile communication device.

General definitions for terms utilized in the pertinent art are set forth below.

APP is a software application for a mobile phone such as a smart phone.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

BLUETOOTH technology is a standard short range radio link that operates in the unlicensed 2.4 gigaHertz band.

Code Division Multiple Access ("CDMA") is a spread spectrum communication system used in second generation and third generation cellular networks, and is described in U.S. Pat. No. 4,901,307.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Direct Inward Dialing ("DID") involves a carrier providing one or more trunk lines to a customer for connection to the customer's private branch exchange ("PBX") and a range of telephone lines are allocated to this line.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Interactive voice response ("IVR") is a telephone technology in which a user uses a phone to interact with a database to acquire information.

Long Term Evolution ("LTE") is a next generation communication network.

Multimedia messaging service ("MMS") communication is a communication transmitted to and from a mobile phone that includes a multimedia content such as a digital photograph (JPEG), videos, and the like.

Mobile Originated ("MO") is a text message that is sent from a mobile phone.

Mobile Terminated ("MT") is a text message that is sent to a mobile phone.

Public Switch Telephone Network ("PSTN") is a telecommunication system in which networks are inter-connected to allow telephones to communicate with each other throughout the world.

Short Message Service ("SMS") is text messaging communication using a mobile phone or other device to send messages up to 160 characters in length.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

A SMS aggregator is an entity that provides connectivity with a mobile phone carrier by offering a SMS gateway to send and receive messages and other digital content.

A SMS Gateway is used to send text messages with or without a mobile phone, and is used by aggregators to forward text messages to mobile phones.

Telephone Consumer Protection Act ("TCPA") of 1991 restricts the use of SMS text messages received by mobile phones, and SMS messages sent without a consumer's consent can violate the TCPA.

Transfer Control Protocol/Internet Protocol ("TCP/IP") is a protocol for moving files over the Internet.

Voice over Internet Protocol ("VoIP") relates to communications transmitted over the Internet such as SKYPE.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

There is a need for a mobile application that allows for a different type of command activation.

BRIEF SUMMARY OF THE INVENTION

The present invention provides a mobile application that utilizes accelerometer-based activation to command a request.

One aspect of the present invention is a method for application and mobile web navigation on a mobile communication device. The method includes accessing a mobile application resident on a mobile communication device of an end user. The mobile application interfaces with an accelerometer of the mobile communication device. The method also includes displaying a request page for the mobile application. The request page comprises action instructions for retrieving a request. The method also includes shaking the mobile communication device to activate the accelerometer of the mobile communication device to transmit an accelerometer signal to request page of the mobile application. The method also includes performing an action upon receiving the accelerometer signal to retrieve the request on the mobile communication device. The method also includes displaying the request on the mobile communication device.

Another aspect of the present invention is a system for application and mobile web navigation on a mobile communication device. The system includes mobile communication devices, a network, request sites and a request server. Each of the plurality of mobile communication devices is associated with an end-user and each mobile communication device comprises a resident mobile application configured to interface with an accelerometer of the mobile communication device, display a request page comprising action instructions for retrieving a request, perform an action upon receiving an accelerometer signal to retrieve the request on the mobile communication device, the accelerometer signal sent to the mobile application upon shaking of the mobile communication device, and configured to display the request on the mobile communication device. Each of the request sites is in communication with the network and each has a request. The request server is in communication with each of the request sites and each of the mobile communication devices. The request server receives a request transmission from each of the mobile communication devices and retrieves the request from a corresponding request site.

Yet another aspect of the present invention is a mobile communication device comprising an accelerometer which transmits a signal upon shaking of the mobile communication device and a resident mobile application. The mobile application is configured to interface with the accelerometer of the mobile communication device, display a request page comprising action instructions for retrieving a request, perform an action upon receiving the accelerometer signal to retrieve the request on the mobile communication device, the accelerometer signal sent to the mobile application upon shaking of the mobile communication device, and configured to display the request on the mobile communication device.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

As shown in FIGS. 1, 2, 3, 4, 4A and 4B, a resident mobile application 75 on a mobile communication device 25 interfaces with an accelerometer 126 (shown in FIG. 5) of the mobile communication device 25 in order to activate a request upon shaking the mobile communication device 25, which results in an action performed by the resident mobile application 76. In one embodiment, the request is a new page in a HTML based application and the action is navigating to the new page in the HTML based application. In another embodiment, the request is a new page in a downloaded application and the action is navigating to the new page in the downloaded application. In yet another embodiment, the request is a form and the action is posting the form. In yet another embodiment, the request is a website and the action is fetching a link to the website. In yet another embodiment, the instruction is a hypertext link. In yet another embodiment, the instruction is a navigation button.

Figure 1:
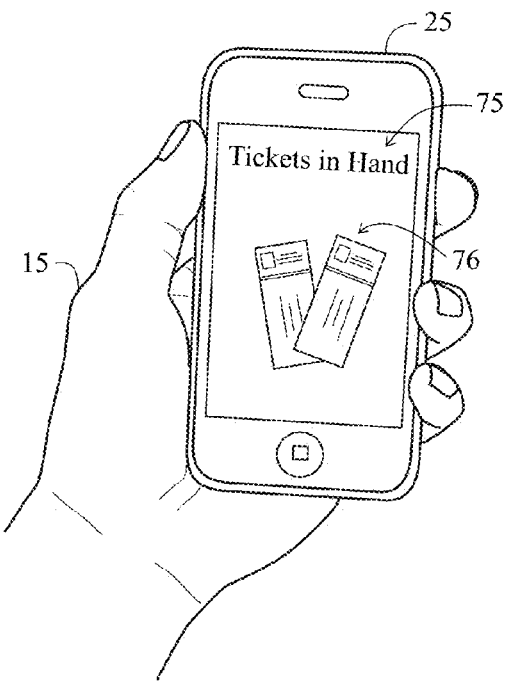
FIG. 1 is an illustration of a mobile communication device displaying a request page of a resident mobile application.
Figure 2:
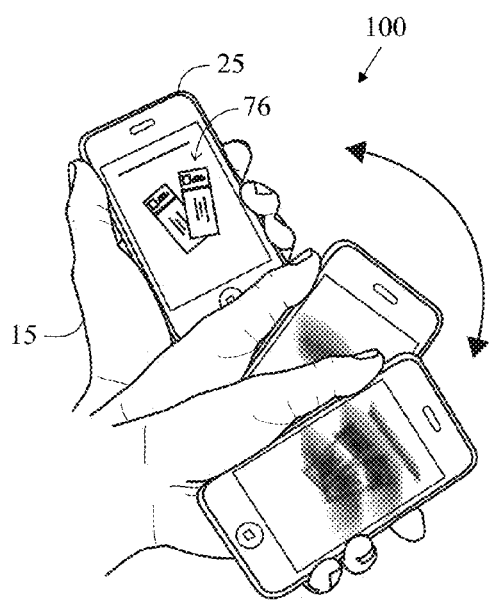
FIG. 2 is an illustration of a user shaking a mobile communication device to activate an accelerometer to transmit a signal to the resident mobile application.
Figure 3:
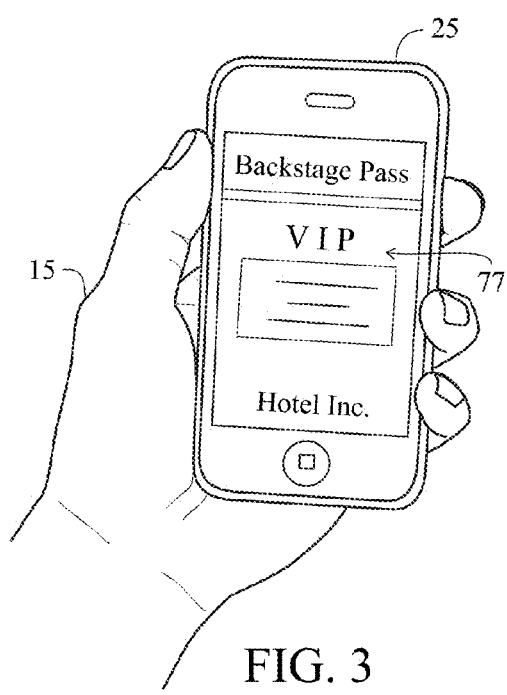
FIG. 3 an illustration of a mobile communication device displaying the request.

For example in FIG. 1, an end user 15 launches a resident mobile application 75 on a mobile communication device 25. The resident mobile application 75 displays a request page with tickets comprising action instructions 76 for retrieving a request. In FIG. 2, the end user 15 shakes the mobile communication device 25 to activate an accelerometer 126 of the mobile communication device. The accelerometer 126 transmits an accelerometer signal to the resident mobile application 75. Upon receiving the accelerometer signal, the resident mobile application 75 performs an action to retrieve the request on the mobile communication device 25. As shown in FIG. 3, the request 77 (VIP passes) is shown on a display page of the resident mobile application 75 on the mobile communication device 25.

Figure 4:
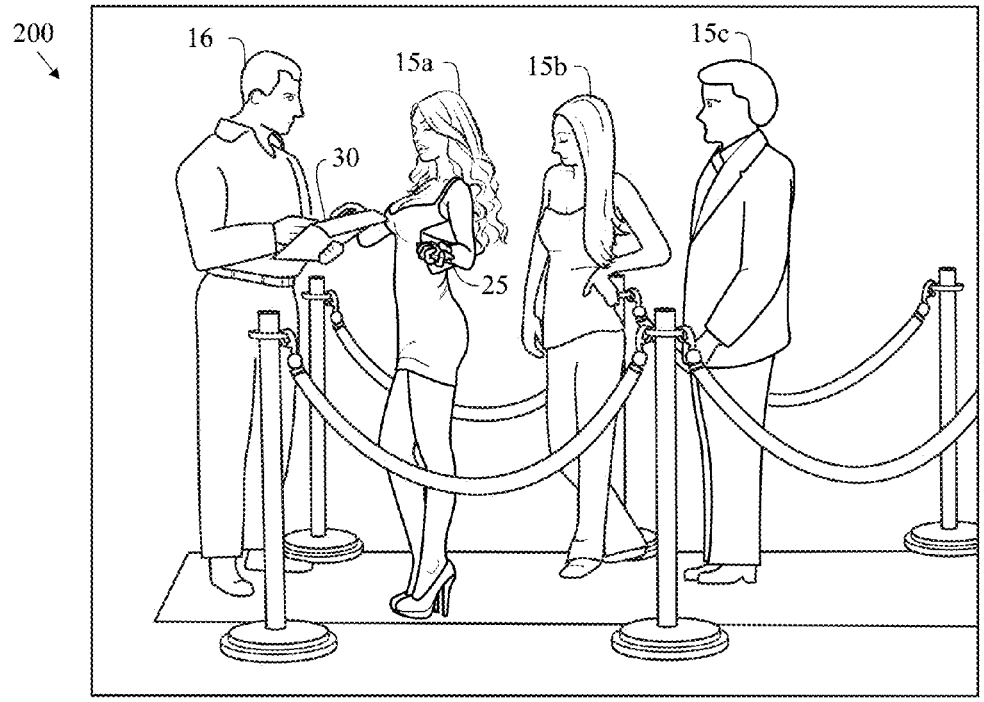
FIG. 4 is an illustration of patrons waiting to backstage at an event.
Figure 4A:
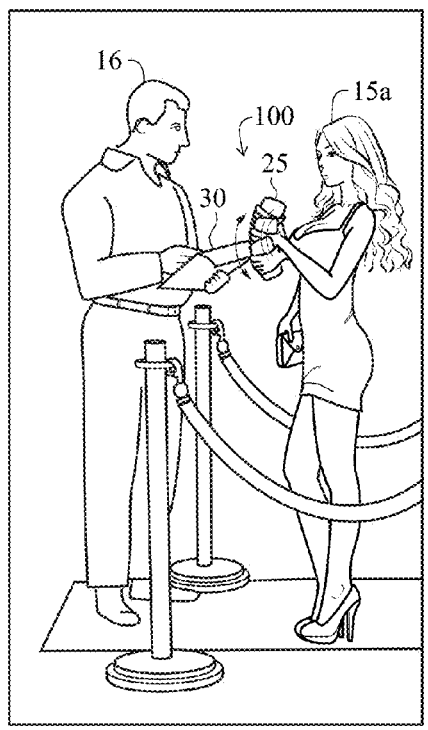
FIG. 4A is an illustration of a patron shaking her mobile phone to activate an accelerometer to transmit a signal to a resident mobile application to retrieve the patron's backstage pass.
Figure 4B:
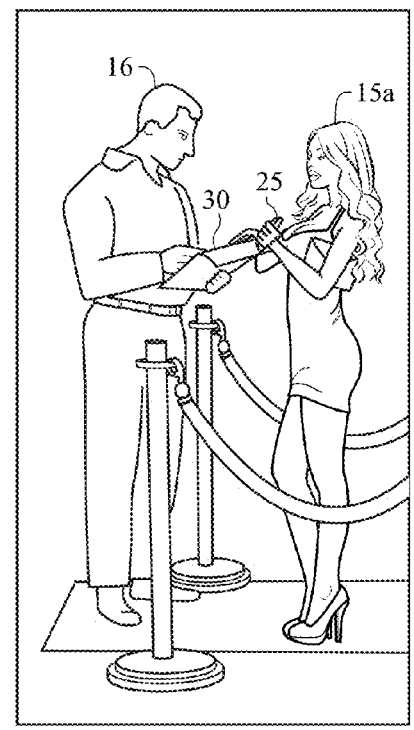
FIG. 4B is an illustration of the patron showing her backstage pass to the guard.

Another example of the present invention in use is shown in FIGS. 4, 4A and 4B. A scene at a nightclub 200 has a patron 15a is waiting in line with other patrons 15b and 15c while a doorman 16 verifies access to the nightclub. The end user 15a has items in both hands and thus navigating through pages on a mobile browser would be difficult. The resident mobile application 75 displays a request page with action instructions 76 for retrieving a request. The end user 15a shakes the mobile communication device 25 to activate an accelerometer 126 of the mobile communication device. The accelerometer 126 transmits an accelerometer signal to the resident mobile application 75. Upon receiving the accelerometer signal, the resident mobile application 75 performs an action to retrieve the request on the mobile communication device 25. The present invention allows the end user 15a to shake the mobile communication device 25 to show an access pass on her mobile communication device 25 that is confirmed on a list 30 by the doorman 16.

The mobile communication devices (host devices) 25 utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

Figure 5:
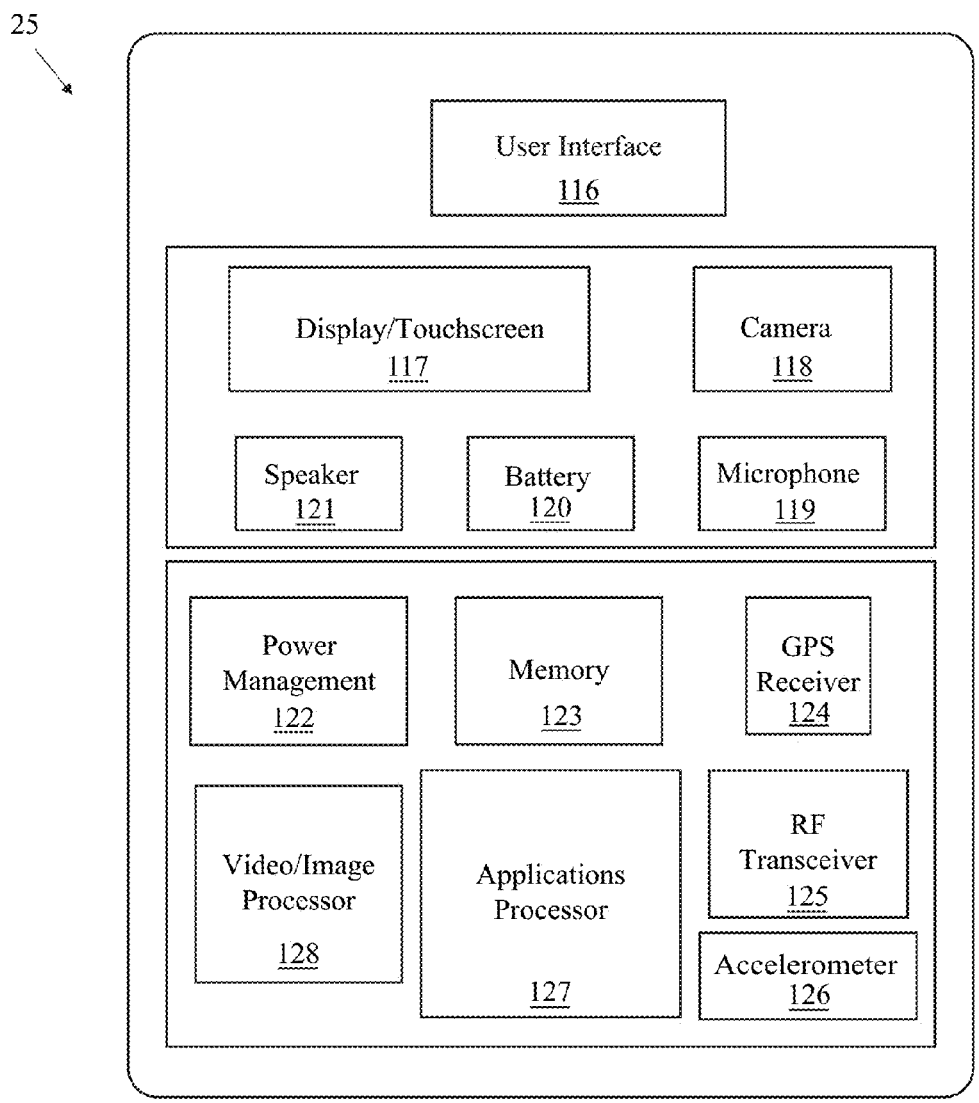
FIG. 5 is a block diagram of a mobile communication device.

FIG. 5 is a block diagram of a preferred mobile communication device 25 utilized with the present invention. The mobile communication device 25 preferably comprises a user interface 116, a touchscreen 117, a camera 118, a microphone 119, a battery 120, a speaker 121, a power management component 122, a memory 123, a GPS receiver 124, a RF transceiver 125, an accelerometer 126, an applications processor 127 and a video/image processor 128. Those skilled in the pertinent art will recognize that other components may be present in a mobile communication device without departing from the scope and spirit on the present invention. A resident mobile application is preferably stored in a memory 123 of the mobile communication device 100 and interfaces with the accelerometer 126 of the mobile communication device 100.

Figure 6:
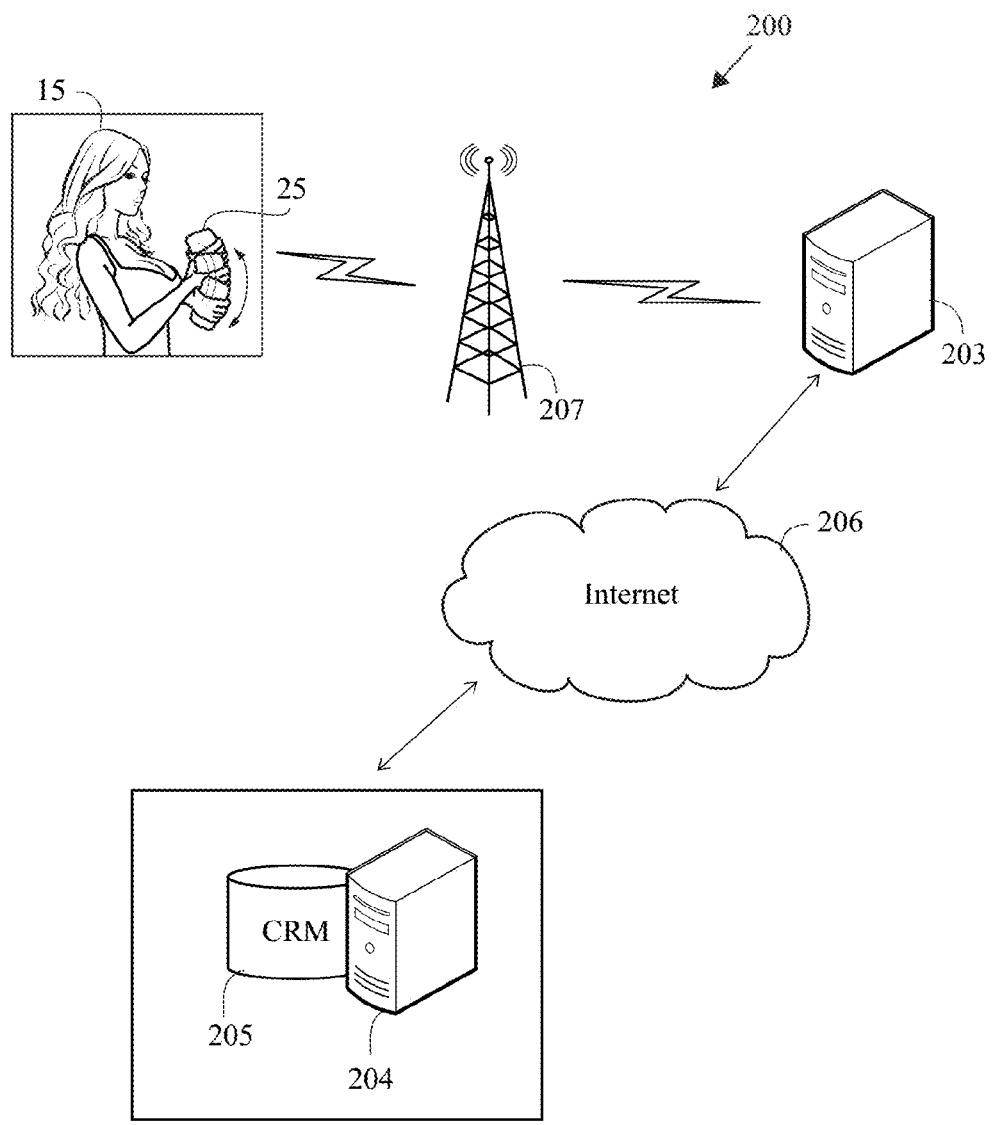
FIG. 6 is a block diagram of a system for retrieving a request activated by shaking a mobile communication device.

As shown in FIG. 6, a system 200 includes an end-user 15 that shakes a mobile communication device 25. The shaking activates a motion sensor such as an accelerometer 126 which sends a signal to a resident mobile application 76 to perform an action. The resident mobile application 76 transmits a request over a network 207 to a request server 203 which transmits the request over the Internet 206 to a request site 204 having a database 205. The request is retrieved and sent from the request site 204 over the Internet 206 to the request server 203 over the communications network 207 to the mobile communication device 25. For example, if the end user 15 wanted to request tickets for an event as a reward for reaching a goal in a rewards program, the end user would shake the mobile communication device 25 and an electronic ticket would be retrieved from rewards program site 204 and transferred to the mobile communication device 25.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

A mobile communication service provider (aka phone carrier) of the customer such as VERIZON, AT&T, SPRINT, T-MOBILE, and the like mobile communication service providers, provide the communication network for communication to the mobile communication device of the end user.

Figure 7:
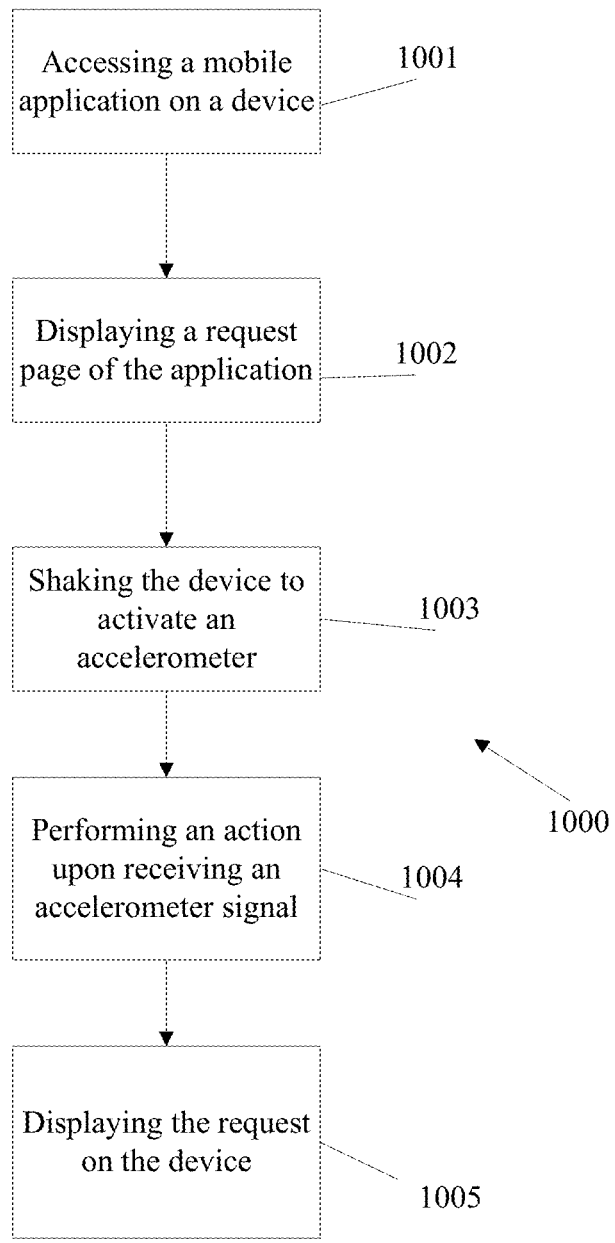
FIG. 7 is a flow chart of a general method for retrieving a request activated by shaking a mobile communication device.

A flow chart of a method 1000 for application and mobile web navigation on a mobile communication device is shown in FIG. 7. At block 1001, an end user accesses a mobile application resident on a mobile communication device of an end user. The mobile application interfaces with an accelerometer of the mobile communication device. At block 1002, a request page for the mobile application is displayed on the mobile communication device. The request page comprises action instructions for retrieving a request. At block 1003, the mobile communication device is shaken to activate the accelerometer of the mobile communication device to transmit an accelerometer signal to the request page of the mobile application. At block 1004, an action is performed upon receiving the accelerometer signal to retrieve the request on the mobile communication device. At block 1005, the request is displayed on the mobile communication device.

Another embodiment of the present invention is utilized for gaming. An end-user shakes a mobile communication device that displays dice for a gaming application. Shaking activates the accelerometer to send a signal to the gaming application which retrieves a reward for a loyalty program. Various embodiment of the present invention can be used with Boyle, U.S. patent application Ser. No. 13/769,376, filed on Feb. 16, 2013, for a System And Method For Managing Games In A Mobile Virtual Casino, which is hereby incorporated by reference in its entirety. Various embodiment of the present invention can be used with Boyle, U.S. patent application Ser. No. 13/789,686, filed on Mar. 8, 2013, for a System And Method For Secure Play In A Mobile Virtual Casino, which is hereby incorporated by reference in its entirety. Various embodiment of the present invention can be used with Boyle et al., U.S. patent application Ser. No. 13/310,741, filed on Dec. 3, 2011, for a System And Method For Dynamic Binding Of Prizes To Multi-Outcome Games, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim:

1. A method for application and mobile web navigation on a mobile communication device, the method comprising:
    opening a mobile application resident on a mobile communication device of an end user, the mobile application interfaced with an accelerometer of the mobile communication device, the end user opening the mobile application;
    displaying a request page for the mobile application, the request page comprising an action instruction for retrieving a request;
    shaking the mobile communication device to activate the accelerometer of the mobile communication device to transmit an accelerometer signal to the displayed request page of the mobile application, the end-user physically shaking the mobile communication device while the request page is displayed;
    performing an action on the mobile application upon receiving the accelerometer signal to retrieve the request on the mobile communication device; and
    displaying the request on the mobile communication device,
    wherein the request is a new page in a downloaded application and the action is navigating to the new page in the downloaded application, and
    wherein the action instruction is a hypertext link or a navigation button.

2. The method according to claim 1 wherein the request is a new page in a HTML based application and the action is navigating to the new page in the HTML based application.

3. The method according to claim 1 wherein the request is a form and the action is posting the form.

4. The method according to claim 1 wherein the request is a website and the action is fetching a link to the website.

5. The method according to claim 1 further comprising transmitting a command from the mobile communication device for the request to a request service over a network and receiving the request from the request service over the network at the mobile communication device.

6. A system for application and mobile web navigation on a mobile communication device, the system comprising:
    a plurality of mobile communication devices, each of the plurality of mobile communication devices associated with an end-user and each mobile communication device comprising a resident mobile application that interfaces with an accelerometer of the mobile communication device, displays a request page comprising an action instruction for retrieving a request, performs an action upon receiving an accelerometer signal to retrieve the request on the mobile communication device, the accelerometer signal sent to the mobile application upon shaking of the mobile communication device by an end-user while the resident mobile application is open on each mobile communication device and the request page is displayed, and displays the request on the mobile communication device;
    a network;
    a plurality of a request sites, each of the plurality of request sites in communication with the network and each having a request; and
    a request service, the request service in communication with each of the plurality of request sites and each of the plurality of mobile communication devices, wherein the request service receives a request transmission from each of the plurality of mobile communication devices and retrieves the request from a corresponding request site of the plurality of request sites,
    wherein the request is a new page in a downloaded application and the action is navigating to the new page in the downloaded application, and
    wherein the action instruction is one of a hypertext link, a navigation button and a request to a request service.

7. The system according to claim 6 wherein each of the plurality of mobile communication devices is a mobile phone or a tablet computer.

8. The system according to claim 6 wherein the request is a new page in a HTML based application and the action is navigating to the new page in the HTML based application.

9. The system according to claim 6 wherein the request is a form and the action is posting the form.

10. The system according to claim 6 wherein the request is a website and the action is fetching a link to the website.

* * * * *